UNITED STATES PATENT OFFICE.

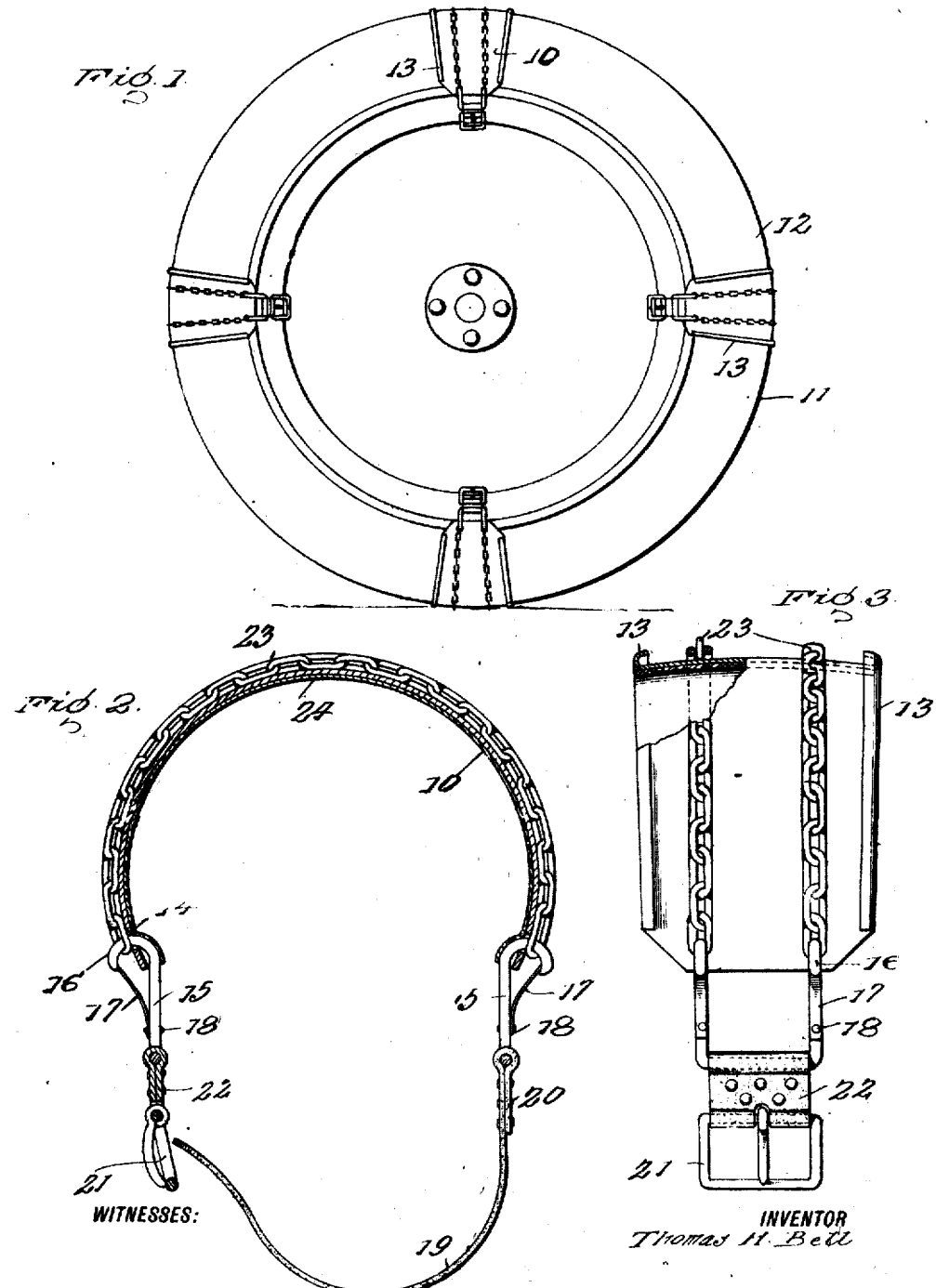

THOMAS H. BELL, OF NEW YORK, N. Y., ASSIGNOR OF ONE-HALF TO JOHN G. SCHOENLEBER, OF BROOKLYN, NEW YORK.

ANTISKID DEVICE.

1,333,788.   Specification of Letters Patent.   Patented Mar. 16, 1920.

Application filed April 22, 1919. Serial No. 291,849.

*To all whom it may concern:*

Be it known that I, THOMAS H. BELL, a citizen of the United States, residing at New York city, in the county of New York and State of New York, have invented certain new and useful Improvements in Antiskid Devices, of which the following is a specification.

This invention has relation to pneumatic tires or casings, and has for an object to provide a device which includes a metallic plate formed to closely engage and conform to the surface of a tire casing, means for securing the wheel, and articulated or linked elements preferably secured to the securing means for the plate and extending over the plate to afford sufficient frictional engagement with the ground or road to prevent skidding, to enable the vehicle to extricate itself from slippery places as well as other purposes and advantages which will appear as the nature of the invention is more specifically set forth.

Another object of the invention is to provide a device having the characteristics above set forth and including specifically a steel plate to extend transversely across the tread of a tire casing with a removable means applied to each end thereof adapted to be connected through the medium of a strap or other flexible element, and one or more sections of chains having their end links connected to said securing means whereby to relieve strain upon the plate and to provide a firm connection with the securing means as will presently appear.

In addition to the foregoing, this invention comprehends improvements in the details of construction and arrangement of parts, to be hereinafter described and particularly set forth in the appended claim.

In the accompanying drawings in which similar and corresponding parts are designated by the same characters of reference throughout the several views in which they appear—

Figure 1 is a view in side elevation of a vehicle wheel illustrating the application thereto of a plurality of devices constructed in accordance with my invention.

Fig. 2 is a view of one of the devices in section, and

Fig. 3 is a view thereof in end elevation partly in section.

With reference to the drawings, 10 indicates a plate formed preferably of steel although it will be obvious that any other suitable material may be utilized. Said plate is curved transversely and longitudinally to engage and closely fit the tread 11 of a tire casing indicated at 12. It will be noted that the ends of the plate 10 extend to a point adjacent the felly of the vehicle wheel. The plate is furthermore formed upon its longitudinal edges with a turned over portion 13 formed by pressing or otherwise bending the material forming the plate, said bend being directed outward so as to afford a rounded corner upon the edges of the plate to prevent the same from marring or injuring the surface of the tire in the event that the armor plate should become tilted during use. The ends of the plate are provided with apertures 14, and at each end I provide a clip which is formed by bending a rod or heavy wire 15 into substantially U-shaped configuration with the terminals thereof rounded to form hooked portions 16 which enter the openings 14. To prevent accidental dislodgment of the securing elements from the plate I provide a steel spring 17 secured by means of a rivet or the like 18 to the intermediate portion of a connecting member 15 with the opposite end of the spring finger engaged within the inner surface of the turned over or hooked portion 16 as clearly shown in Fig. 2. I next provide a connecting element in the form of a strap. To one of the clips I attach a strap 19 of leather or other suitable material bent around the bight portion of the clip and the end secured to the strap by means of rivets 20. Upon the other clip I mount a buckle 21 of conventional type through the medium of a link 22 of leather to provide flexibility. Extending longitudinally of the plate 10 and upon the outer surface is a pair of sections of chains 23 or other suitable articulated elements with the end links engaged upon the hook terminals 16 of the clips as shown in Fig. 2. I also provide a lining 24 of canvas or other suitable material upon the inner surface of the plate 10.

In use, one or more of these devices are employed and it will be seen from Fig. 1 that the plates are embraced about the pneumatic tire to extend transversely thereof, the strap 19 being brought beneath the felly and inserted in the buckle 21 thereby securely retaining the device against movement. It will be obvious that owing to the provision of one or more of these devices skidding will be prevented because of the firm frictional engagement provided between the tire and surface of the road. Also, this device will be of particular value in extricating a vehicle from soft ground because of the excellent tractive qualities imparted to the tire by the provision of these devices. In the event that the device should become tilted during use it is apparent that the rounded edges 13 will prevent the tread surface of the tire from becoming marred or otherwise injured. It will also be obvious because of the connection of the flexible elements 23 directly with the clip 15, all strain upon the plate 10 will be obviated. Other useful advantages will readily occur to those familiar with the art to which this invention appertains.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claim.

Having thus described my invention, what I claim as new and desire to secure by United States Letters Patent is:

An anti-skid device comprising a metallic plate adapted to extend transversely of a pneumatic tire and conforming to the transverse curvature of the latter, each end of said plate having a pair of closely spaced openings, a pair of chains resting upon the plate each of a length to permit the opening of each end link to register with one of the said openings of the plate, a pair of U-shaped wire clips each having their terminals curved and said terminals entered through the openings of the plate and through the registering end links, and means to connect the bight portion of one clip with the bight portion of the other clip.

In testimony whereof I affix my signature in presence of two witnesses.

THOMAS H. BELL.

Witnesses:
WM. ZEAMAR,
G. PETRINO.